(12) United States Patent　　　(10) Patent No.:　US 12,634,247 B2
Klemm et al.　　　　　　　　　　　(45) Date of Patent:　　May 19, 2026

(54) LOW-CODE MESSAGE-DRIVEN COLLABORATION AMONG AND WITH VIRTUAL AGENTS

(71) Applicant: Avaya Management L.P., Durham, NC (US)

(72) Inventors: Reinhard P. Klemm, West New York, NJ (US); James McTiernan, Venus, PA (US); Elizabeth Harrington, Long Beach, NY (US); John A. Young, Buntingford (GB)

(73) Assignee: Avaya Management L.P., Durham, NC (US)

( * ) Notice: Subject to any disclaimer, the term of this patent is extended or adjusted under 35 U.S.C. 154(b) by 240 days.

(21) Appl. No.: 18/099,848

(22) Filed: Jan. 20, 2023

(65) Prior Publication Data

US 2024/0250921 A1　　　Jul. 25, 2024

(51) Int. Cl.
　H04L 51/02　　　(2022.01)
　H04L 51/21　　　(2022.01)
(52) U.S. Cl.
　CPC .............. H04L 51/02 (2013.01); H04L 51/21 (2022.05)
(58) Field of Classification Search
　CPC ................................ H04L 51/02; H04L 51/21
　See application file for complete search history.

(56) References Cited

U.S. PATENT DOCUMENTS

| | | | |
|---|---|---|---|
| 7,676,539 B2 | 3/2010 | Jhoney et al. | |
| 8,634,543 B2 | 1/2014 | Flockhart | |
| 9,276,802 B2 | 3/2016 | Lynch et al. | |
| 9,729,592 B2 | 8/2017 | Slayton et al. | |
| 10,848,443 B2 | 11/2020 | Helmy | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0141919 A1* | 6/2011 | Singh .................. | H04L 41/0681 |
| | | | 370/252 |
| 2015/0063556 A1* | 3/2015 | Uba .................... | H04M 3/5232 |
| | | | 379/265.05 |
| 2018/0124241 A1* | 5/2018 | Vijaywargi ......... | H04M 3/5237 |
| 2020/0151650 A1* | 5/2020 | Rhodes ............... | G06Q 30/016 |
| 2021/0157989 A1* | 5/2021 | Orr ........................ | G06F 40/35 |
| 2022/0239567 A1* | 7/2022 | Manuel-Devadoss ... | G06N 3/09 |
| 2023/0237180 A1* | 7/2023 | Scott ....................... | G06F 9/451 |
| | | | 726/28 |

* cited by examiner

*Primary Examiner* — Christopher B Robinson
*Assistant Examiner* — Tania M Pena-Santana
(74) *Attorney, Agent, or Firm* — Sheridan Ross P.C.

(57)　　　　　ABSTRACT

Virtual agents may be deployed to conduct a communication with a customer to determine and resolve a work item. During the communication, the virtual agent may need to obtain or provide information to other entities. However, coding a virtual agent to perform such communications is difficult and error prone. By providing a messaging system with a central repository, the virtual agent may register an interest in another entity, group of entities, the state of one or more entities, or information contained therein via messaging to a central repository. The central repository then provides callback messages to the virtual agent that matches the interest or any other conditions specified.

20 Claims, 9 Drawing Sheets

200

108 — Customer Communication Device

202 — VA

212 — Msg(data)

204 — Entity

214 — Registration

216 — Msg(data)

206 — Central Registry

208

210

LOW-CODE MESSAGE-DRIVEN COLLABORATION AMONG AND WITH VIRTUAL AGENTS

FIELD OF THE DISCLOSURE

The invention relates generally to systems and methods for communications and particularly to facilitating communications between automated entities via a central registration.

BACKGROUND

Contact centers connect customers with agents to address a work item during a call or other form of communication. The agents are increasingly automated or "virtual" agents running on computing devices. While simple interactions may allow for algorithmic-determined agents, such as presenting menu items or a small list of options and receiving an input to an interactive voice response (IVR) or a dual-tone multifrequency (DTMF) component, contact centers are increasingly utilizing natural language interactions with customers, both to receive issues and to provide instructions or information to the customer. Human speech is nuanced and complex. For example, words can impart one meaning (e.g., "Yeah, right," meaning "agreement" or a "confirmation") while certain vocal inflections of the customer may negate the meaning of the words, such as by applying sarcasm (e.g., "Yeah, right," meaning "no" or "you said something I find ridiculous"). Similarly, there are countless ways a customer may describe a situation or issue, which further complicates the virtual agent's task in determining the underlying work item and its resolution. Often the virtual agent will need to convey information or instructions to the customer as a part of the resolution. To be successful, the virtual agent must convey the information or instructions to the customer in a way that is clear to the customer while maintaining a human-like interaction (e.g., friendly, personable, empathetic, etc.). If the delivery is unclear or machine-like, the work item may fail to be resolved or the customer may not trust the virtual agent and insist on talking with a human agent, a high-cost resource. Utilizing human agents often results in additional or extended calls and more time spent maintaining the call with the customer on hold while waiting for a human agent, all of which further tax the computing and networking resources of the contact center. Additionally, despite best efforts to match the customers to a human agent having the skills required to resolve their issues, the human agent may need to spend time researching an issue, asking a supervisor or colleague for assistance, or simply asking the customer clarifying questions. Despite some customers' perceptions, automated agents may be faster and more accurate in determining the work item and providing or performing the associated resolution.

Developing virtual agents on conversational artificial intelligence (AI) platforms, where instantiations of the AI can share data, collaborate, coordinate with each other, and synchronize actions and decisions, requires substantial developer effort, thus contradicting the no/low-code spirit of modern conversational AI platforms. The same issue also inhibits the ability to communicate between virtual agents and external systems and between virtual agents and human supervisors. Furthermore, developing and deploying advanced virtual agents, where multiple instances exhibit a collective behavior, is an exceptionally difficult task for virtual agent developers.

SUMMARY

These and other needs are addressed by the various embodiments and configurations of the present invention. The present invention can provide a number of advantages depending on the particular configuration. These and other advantages will be apparent from the disclosure of the invention(s) contained herein.

Embodiments disclosed herein provide, among other things, a flexible messaging capability to conversational AI platforms that allow instances of virtual agents, even those deployed across different platforms, to communicate and collaborate with each other, with external systems, with human supervisors, and within individual instances. Benefits of the messaging capabilities disclosed include deployment with little to no coding and without a need for deploying additional software on a per-virtual agent basis.

In one embodiment, a centralized registry is provided. The centralized registry maintains "interests" using a Representative State Transfer (REST) Application Programming Interface (API) that can be called from virtual agent instances on one or multiple conversational AI platforms, as well as, from external systems, user interfaces that serve humans and programmatic supervisors.

"Entity" or "entities," as used herein, are variously embodied as actors that comprise one or more of virtual agents, external systems, and/or supervisors (automated or human utilizing a supervisor client device). When the plural form, "entities," is used, the plurality of actors may be homogenous or heterogeneous, as determined by the usage thereof. "Entity instance," as used herein, is variously embodied to include conversations or sessions comprising one or more entities.

In one embodiment, a virtual agent registers an interest in a shared resource such as a contact center live agent queue "billing-en-US" before it escalates an automated conversation to a live agent conversation. As a benefit, a conversational AI platform can expose a no-code registration construct to virtual agents.

When an entity instance registers its interest with the registry, the entity instance submits a structured object to the registry that it is at liberty to compose, along with a chosen name of the interest (e.g., "billing-en-US"), a URL for an entity instance Webhook, an entity identifier, an entity instance identifier, a priority, and an expiration time for the interest. The structured object of a virtual agent instance that wants to escalate an automated conversation to live agent queue "billing-en-US," for example, may contain the current timestamp as well as an "urgencyScore" based on the customer's intent or other factor. When the virtual agent instance is connected to a "billing-en-US" live agent, the virtual agent instance deregisters its interest in "billing-en-US" via the registry REST API. Thus, the interest named "billing-en-US" reflects all virtual agent instances that are waiting to connect a customer to a live agent associated with contact center agent queue "billing-en-US". If an entity instance does not explicitly deregister a previously registered interest, the registry may be automatically removed after the specified expiration time. A conversational AI platform can expose a no-code deregistration construct to virtual agents.

When an entity instance needs to send a message to one or more other entity instances that have previously registered an interest to the registry, the sender invokes the registry REST API to determine (1) which interest(s), (2) which entity or entities, (3) which entity instance(s) to target with the message. The entity instance may choose to target one or multiple interests, entities, and entity instances and can describe the target(s) via an expression that uses some or all of the registered interest parameters as expression terms: the interest identifier, entity identifier, entity instance identifier, priority, expiration time, the content of the structured object submitted at registration time, etc. To this end, a conversational AI platform can expose a no-code messaging construct to virtual agents. A message sender may specify an initial delay, multiplicity, periodicity to send a message multiple times, or other relevant message attribute. The registry REST API invokes the Webhook URLs of each targeted receiver and includes the targeted interest(s), sender information, and the receiver's previously registered structured object in the Webhook call. The message sender may also specify a structured object that transfers part or all of its state to the recipient(s) via the centralized registry as part of the Webhook calls. A receiver can process the combination of its current internal state, the sender's structured message object, and the structured object that the receiver previously registered with the registry, to decide on a subsequent action or sequence of actions. For example, a virtual agent instance that is embedded in a conversation between a customer and a live agent for agent queue "billing-en-US" may recognize the end of the live conversation and, at this time, send a message to all targets for interest "billing-en-US" across all virtual agents. Virtual agent instance receivers could then display a prompt to their customers saying that their position in the wait queue for a live agent has decreased by one. The execution of actions in receivers may be part of the current conversational flow between receivers and their customers or asynchronous to that flow.

A human supervisor may want to send a message (via a dashboard running on a networked client device) to all virtual agent instances that are currently registered to interest "billing-en-US" and have an urgency score at or above a particular threshold value, such as 0.8. The supervisor may want to entice the customers connected to these virtual agent instances to remain queued and the supervisor's message could include a structured object that defines a special offer to these customers. A receiving virtual agent instances could then transform the special offer definition into a sequence of prompts to the waiting customers that would allow these customers to accept the special offer while waiting for a live agent. The supervisor can send the special offer with a multiplicity greater than one and a desired periodicity. Thus, the special offer can be rendered multiple times to eligible waiting customers. The receiving virtual agent instances could perform a different transformation each time they receive the special offer message so that customers would see a dynamically constructed enticement.

Continuing with the above example, the virtual agent instance includes a timestamp in the structured object at the time it registers an interest in "billing-en-US". The registry sends the structured object back to the virtual agent instance when a sender targets this instance, the instance can then compute an elapsed time since the registration and display an apology to the customer if the elapsed time exceeds a configured threshold. The virtual agent instance may also take further action, such as offering the customer the option to receive a callback instead of extending the wait time on hold. Structured objects included in a registration operation may be complex and reflect the registering entity's internal state at the time of registration and may be used by both the registering entity and by a prospective sender in the future. Senders can make refined decisions about which receivers to target based on the content of structured objects and receivers can recall their instance state at registration time without having to store the state, which is particularly useful when entity instances register multiple interests.

In another embodiment, an entity acts as both an interest registrant and as a message sender to the same interest, with only itself as the message target. Consider the case of a virtual agent instance that is approaching the display of an account number prompt to the customer ("Please enter your account number"). Just before the prompt, it registers an interest in "account-prompt," with a Webhook URL that points to a specific virtual agent sub-flow. It also sends a message to "account-prompt" and specifies itself as the only target of the message and with an initial delay of 60 seconds, i.e., this is a message scheduled to be sent in 60 seconds. Then, it proceeds with the display of the prompt to the customer. When the customer enters their account number within 60 seconds, the virtual agent instance deregisters its interest in "account-prompt," thus it disappears as the target of the "scheduled" message, and the registry will not send the message. However, it the customer does not respond within 60 seconds, the virtual agent will not deregister its interest in "account-prompt" and the registry sends the message. The virtual agent instance will receive a Webhook call that triggers the execution of the designated sub-flow that can act as a timeout handler and, for example, offer a re-prompt with an assisted account number input ("Forgot your account number?"). Similarly, a virtual agent instance can install and execute a "soft timeout" handler for a more complex scenario where the automated conversation with a customer makes slow overall progress and does not progress to a specific point within a configured time window. In this case, the timeout handler might offer the customer an immediate escalation to a live agent. under the assumption that the customer is not handling an automated conversation well.

Virtual agent instances can query the status of the registry with query expressions that support a fine-grained analysis of interest registrations (and de-registrations), for real-time decision-making in entity instances as well as for analytics, both real-time and historical. To this end, a conversational AI platform can expose a low-code query construct to virtual agents. For example, a virtual agent instance might want to find out how many other virtual agent instances are currently registered to "billing-en-US" and have an "urgencyScore" greater than 0.8 with the assumption that higher urgency conversations will take live agents more time to handle than lower urgency conversations. If the number of high-urgency conversations currently registered to "billing-en-US" exceeds a configured threshold, the virtual agent instance may decide to offer its customer a later callback, rather than queuing up this customer in the agent queue. This is a simple example of a collective behavior of homogeneous or heterogeneous virtual agent instances and of federated conversational AI.

Virtual agent instances may register interests that can be interpreted as progress milestones, which can then be consumed by a real-time analytics supervisor dashboard. The dashboard would be able to visually inform supervisors how many conversations are currently between milestone i and i+1 and for how long. If a conversation has spent more than a configured time between milestones i and i+1, a supervisor might drill down on the conversation details and attempt to understand why the conversation has stalled between these milestones. For example, a virtual agent instance may be unable to understand a customer input. Ultimately, the supervisor may decide to send a message via the registry REST API to the corresponding virtual agent instance as a form of intervention or interruption to dislodge the conversation.

Each supervisor dashboard instance can register an interest in, say, "virtual-agent-trouble". When a virtual agent instance encounters an interaction with its customer that it is unable to handle, it can send a message to the interest "virtual-agent-trouble" and target the temporally first of typically multiple registered supervisor dashboard instances. The message would include the relevant state of the virtual agent instance as well as the most recent customer inputs to the virtual agent instance. For example, the customer might respond to a virtual agent prompt with a new intent that the virtual agent instance is not prepared to process at this time (VA: "Please tell me which account you are inquiring about." Customer: "Never mind, how do I apply for a home loan?"). In this case, the message would include a reference to the currently executing virtual agent flow, the prompt that the virtual agent instance rendered to the customer, and the customer input that the virtual agent instance is unable to handle. The targeted dashboard instance would receive the message, deregister its interest in "virtual-agent-trouble," and display a request to the human supervisor who is logged into the dashboard, to intervene, and to assist the virtual agent with its current customer interaction. While the supervisor is investigating and managing the issue, their dashboard would not receive any additional messages (intervention requests) from the message registry because the dashboard had deregistered from interest "virtual-agent-trouble". Once the supervisor has resolved the issue, for example, by pointing the virtual agent to the flow that handles home loan requests, the dashboard instance would re-register its interest in "virtual-agent-trouble" and thus be receptive to new intervention requests.

In the preceding example supervisors register an unspecific interest in "virtual-agent-trouble". However, in other embodiments, supervisors register to more specific interests such as "virtual-agent-trouble-userPrompts" or "virtual-agent-trouble-3rdParty Integration" to support specialization in the supervisor population. Note also that supervisors may be either human or automated, such as a specialized class of bots with machine learning and AI capabilities.

It is envisioned that a virtual agent instance that is associated with the contact center of one business will be able to interact with virtual agent instances and live agents that are associated with the contact centers of other businesses via the registry. In this, a federated virtual agent model, virtual agent instances from different businesses can interact with each other and enable powerful forms of inter-business collaboration. As an example, customer "Bob" is unable to print a document from his laptop, manufactured by computer manufacturer A, to his printer, manufactured by manufacturer B, when using a specific software product from vendor C. When Bob contacts C's virtual agent, the responding virtual agent instance realizes after some initial conversation with Bob that his support request will require participation from not only the software vendor but also from computer manufacturer A and the printer manufacturer B, as it is unclear where the issue is located. To support such inter-business issue resolutions, A, B, and C are members of a virtual agent federation by having each business register a "support" virtual agent instance to interest "ticket-A-B-C" in the registry. The virtual agent instance that is currently interacting with Bob invokes the registry REST API to contact A's and B's virtual agent instances. Although the virtual agent instances from each business may be able to resolve Bob's ticket by exchanging messages via the registry, the virtual agent instances may simply perform additional triage of the issue by collecting relevant information from their respective backend systems, and then escalate to live agents. Each live agent would then automatically be conferenced onto a common communications bridge so that they can collaborate to resolve Bob's ticket in real-time.

Exemplary aspects are directed to:

A system for virtual agent collaboration, comprising: a processor; a network interface to a network; a memory comprising a set of instructions that, when executed by the processor, cause the processor to: execute a virtual agent to conduct a communication, with content encoded therein, with a customer via the network and process a work item determined from the content, wherein completing the work item requires an action by an entity different from the virtual agent; generate a message to register an interest in the entity comprising generating a message comprising an identifier of the virtual agent, an address on the network wherein the virtual agent receives callback messages, and a topic of interest corresponding to the action; send the message to a central repository; receive a callback message from the central repository the action; and complete the work item comprising the action.

A method for virtual agent collaboration, comprising: executing a virtual agent to conduct a communication, with content encoded therein, with a customer via a network and process a work item determined from the content, wherein completing the work item requires an action by an entity different from the virtual agent; generate a message to register an interest in the entity comprising generating a message comprising an identifier of the virtual agent, an address on the network wherein the virtual agent receives callback messages, and a topic of interest corresponding to the action; send the message to a central repository; receive a callback message from the central repository the action; and complete the work item comprising the action.

A system for virtual agent collaboration, comprising: a processor; a network interface to a network; a memory comprising a set of instructions that, when executed by the processor, cause the processor to: execute a first virtual agent to conduct a communication, with content encoded therein, with a customer via the network and process a work item determined from the content, wherein completing the work item requires an action by a second virtual agent differing from the first virtual agent in at least one of an input to at least one training stage, access to a datum required to complete the work item, access to a component requiring an interaction therewith to complete the work item; register an interest of the first virtual agent in the second virtual agent comprising generating a message comprising an identifier of the first virtual agent, an address on the network wherein the first virtual agent receives callback messages, and a topic of interest corresponding to the action; sending the message to the entity via a repository and wherein the message comprises a call Representative State Transfer Application Programming Interface (REST API) to access the repository; receive a callback message from the entity, via the REST API, comprising the action; and complete the work item comprising the action.

Any of the above aspects:

Wherein the action comprises at least one of an act performed by the entity or indicia of the act being performed by the entity;

Wherein the virtual agent sends the message to the entity to comprising sending the message to the central repository via a call to a Representative State Transfer Application Programming Interface (REST API);

Wherein the address on the network comprises a uniform resource locator (URL) of a Webhook for the virtual agent in the call to the REST API;

Wherein: the network comprises a first discrete network and a second discrete network; the processor resides entirely with the first discrete network; the second discrete network maintains a datum required to complete the action and wherein the datum is absent from the first discrete network; and the first discrete network and the second discrete network are interconnected via messages sent to the central repository.

Wherein the action comprises determining the work item.

Wherein the action comprises identifying a collection of actions that, when performed, complete the work item.

Wherein the callback message comprises a plurality of callback messages wherein ones of the callback message differ in at least one of time sent by the entity or a change in a state of the entity.

Wherein upon at least one of the entity or the virtual agent de-registers the interest and terminates the step of receiving of the callback message comprising at least one of the plurality of callback messages.

Wherein the message further comprises at least one of an identifier of the virtual agent, an identifier of an instance of the virtual agent, a priority, and an expiration.

Wherein the message further comprises a structured data object comprising at least one data element maintaining indicia of at least one of the content, the communication, the work item, or a portion of the work item performed by the virtual agent.

Further comprising sending a message to the central repository via a call to a Representative State Transfer Application Programming Interface (REST API).

Wherein the address on the network comprises a uniform resource locator (URL) of a Webhook for the virtual agent in the call to the REST API.

Wherein: the network comprises a first discrete network and a second discrete network; the processor resides entirely with the first discrete network; the second discrete network maintains a datum required to complete the action and wherein the datum is absent from the first discrete network; and the first discrete network and the second discrete network are interconnected via messages sent to the data repository.

Wherein the action comprises determining the work item.

Wherein the action comprises identifying a collection of actions that, when performed, complete the work item.

Wherein the callback message comprises a plurality of callback messages wherein ones of the callback message differ in at least one of time sent by the entity or a change in a state of the entity.

Wherein upon at least one of the entity or the virtual agent de-registers the interest and terminates the step of receiving of the callback message comprising at least one of the plurality of callback messages.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
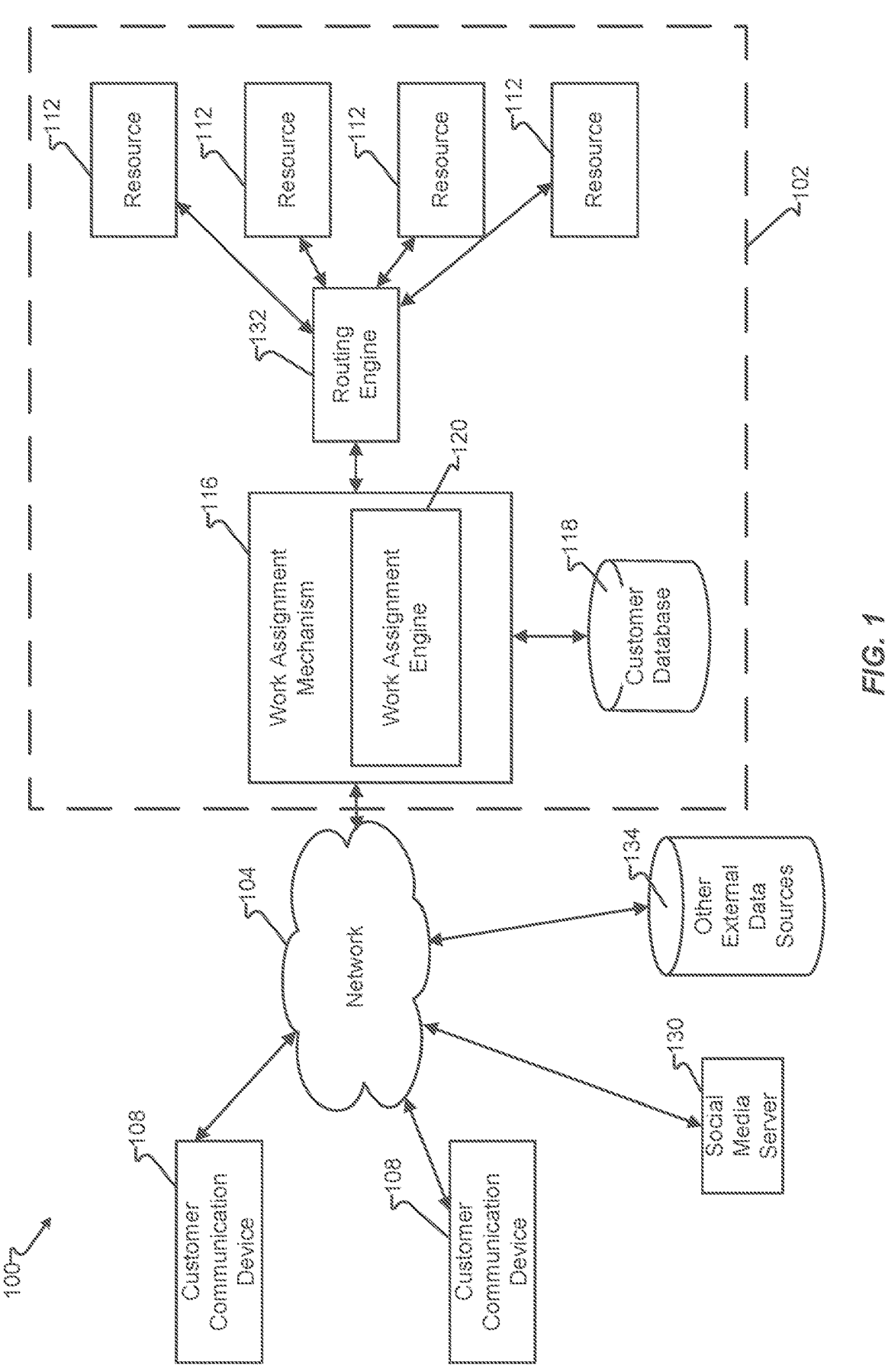
FIG. 1 depicts a system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are themselves, or are associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as illustrated or, in other embodiments, include alterations and/or more and/or fewer components than illustrated. For example, in other embodiments, one or more of resources 112, customer database 118, and/or other components may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134, may be within contact center 102 physically and/or logically, but still be considered external for other purposes (e.g., system administration). For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through various telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VOIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to a particular customer(s). In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resource location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed May 20, 2010, Feb. 17, 2010, and Feb. 17, 2010, respectively; each of which is hereby incorporated herein by reference in its entirety.

The format of the work item may depend upon the capabilities of the customer communication device 108 and/or the format of the communication. In particular, work items are logical representations of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At that point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent to a collection of processing resources 112 via the combined efforts of the work assignment mechanism 116 and routing engine 132. The resources 112 can either be completely automated resources (e.g., artificial intelligence (AI) agents (also known as virtual agents)), Interactive voice response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed among a plurality of service provider customers, one being contact center 102.

In one embodiment, a message is generated by customer communication device 108 and received via communication network 104 at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
FIG. 2 depicts a system in accordance with embodiments of the present disclosure.

FIG. 2 depicts system 200 in accordance with embodiments of the present disclosure. In one embodiment, virtual agent 202 comprises an embodiment of resource 112, when embodied as an autonomous entity, to interact with a customer via their customer communication device 108 over network 104 in order to identify a work item, select a resolution to the work item, and implement the resolution to the work item. Similarly, entity 204 may be embodied as another virtual agent, a different embodiment of resource 112, or other component (e.g., external data source 134, social media server 130, or other component which may be external to contact center 102).

Virtual agent 202 communicates with a customer via a corresponding customer communication device 108 over network 104 (see FIG. 1). The communication may comprise encoded speech, video, text, co-browsing commands, etc. or combinations thereof. The speech is provided by a customer speaking and the resulting sound energy is received by microphone and encoded for transmission on network 104 by customer communication device 108 and/or generated/played by virtual agent 202 or an associated component and encoded for transmission over network 104. Systems, such as those utilizing virtual agent 202, that accommodate natural language received from a customer, strive to process all of the content that such speech may provide. However, human speech is often nuanced. Speech may be provided that directly answers a question (e.g., "yes," "no," etc.), an indirectly answers (e.g., "yeah, let's do that," "that sounds good to me," etc.), includes superfluous information (e.g., irrelevant facts, attempts at humor, speaking but to someone nearby, etc.), includes information outside of the context of the prior communication (e.g., wanting to changing a response to a previously asked question, asking an unrelated question, etc.), or becoming unresponsive.

In order to complete a work item with a customer, virtual agent 202 communicates with the customer to acquire facts associated with the work item. This may be a simple answer to a question (e.g., "What is my account balance?"), wherein the work item is simply to provide a response, or a more complex issue (e.g., "My internet is down"), which may require obtaining additional information, from the customer or other source(s), and selecting a particular workflow (e.g., "Internet service terminated due to non-payment," "Internet service terminated due to central office configuration error," "Internet service terminated due to customer equipment failure," etc.). Finally, a resolution is provided to the work item. The resolution may be to provide information to the customer (e.g., "Your account balance is . . . ."), provide information to another entity (e.g., notify the billing department of a payment credited to the wrong account), perform an action (e.g., issue an account credit), escalate the issue to another entity, or other action.

Virtual agent 202 may be embodied as a neural network. A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Central repository 206 is variously embodied and may comprise one or more servers 208, or other data processing components, and data storage 210 devices, or other data storage components. Central repository 206 may be networked, such as via network 104 and/or another network, to communicate with virtual agent 202 and entity 204. While virtual agent 202 may communicate directly with entity 204 in some circumstances, embodiments herein, unless specifically identified as otherwise, are directed to virtual agent 202 and entity 204 communicating exclusively via messages sent to and received from central repository 206.

Accordingly, in order to resolve a work item, virtual agent 202 may need to provide information, obtain information, or both. The information may comprise a datum or data structure which may further comprise a metadata, such as a status or state change or value of virtual agent 202 or entity 204, for example, a number of registered entities in a particular interest, stage of processing, operational state, a meaning based on the message itself (e.g., a time-triggered message), etc. In one embodiment, virtual agent 202 provides data message 212 to central repository 206 for use by entity 204.

Entity 204 may have an interest in data message 212 provided by virtual agent 202 and, in response to the interest and to be notified of the occurrence or changes thereto, performs registration 214 with central repository 206. Registration 214 may comprise sending a structured object to central repository 206, such as to comprise an identifier of the source (e.g., an identifier of virtual agent 202 or an instance, such as a particular communication with a particular customer communication device 108), a topic of interest (e.g., "billing"), expiration, priority, a callback, a URL for a webhook, and/or other relevant data.

Entity 204 may perform registration 214 in response to a dynamically determined condition, a prompt (e.g., a supervisor monitoring components of contact center 102), or a previously determined configuration. When virtual agent 202 provides data message 212 to central repository 206, central repository 206 performs any processing and provides data message 216 to entity 204. Data message 212 and data message 216 may comprise the same or different data. Processing may include matching the contents of an attribute field of the data with data message 212. For example, registration 214 may include limitations for a particular interest (e.g., "billing"), a valid time, or other condition (e.g., priority>0.8). When present, and evaluated to be true, the condition triggers data message 216 and, when not true, data message 216 is omitted.

Figure 3:
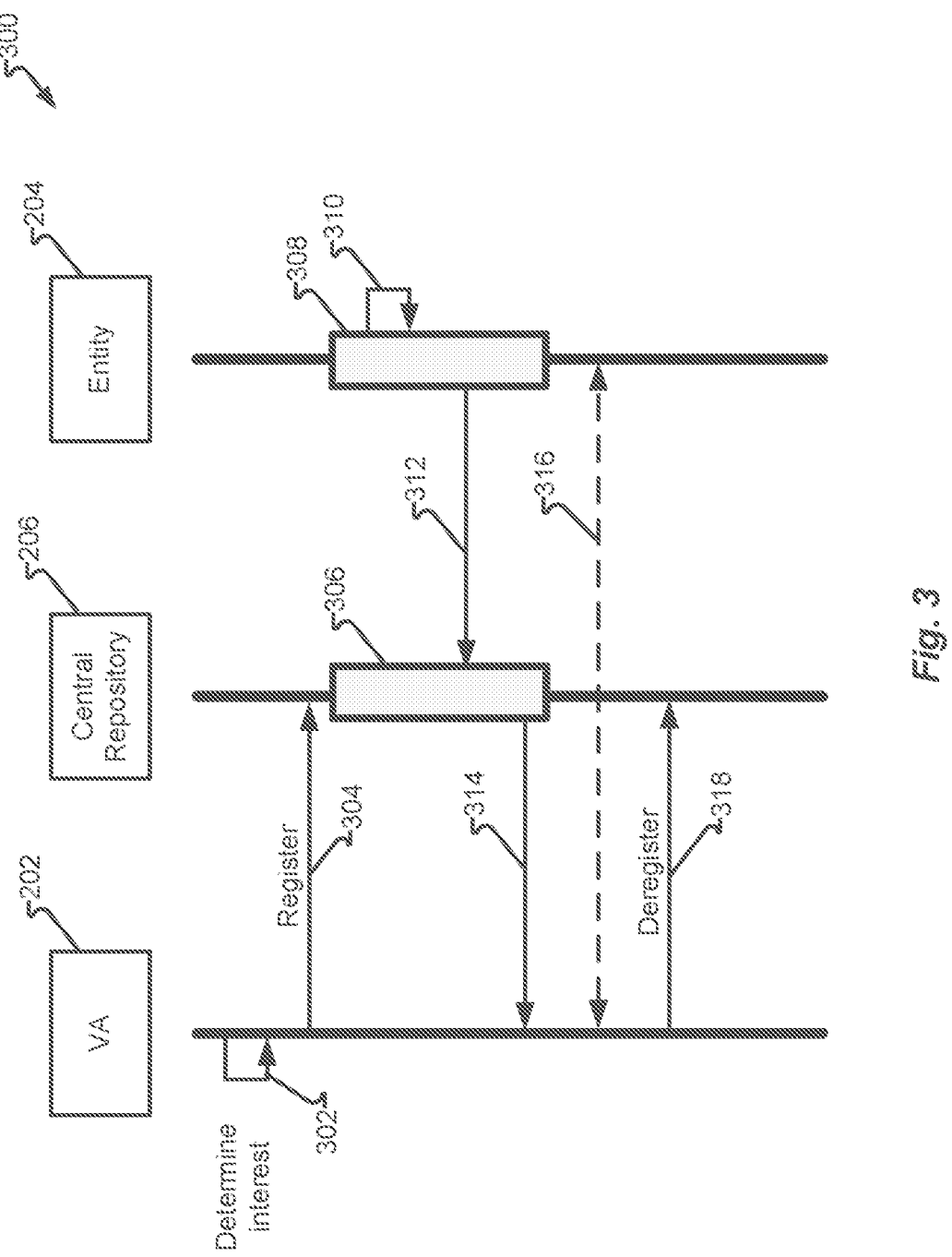
FIG. 3 depicts an interaction in accordance with embodiments of the present disclosure.

FIG. 3 depicts interaction 300 in accordance with embodiments of the present disclosure. In one embodiment, virtual agent 202, which may be further embodied as a particular entity instance, determines an interest in an event or state of a component of contact center 102. For example, virtual agent 202 may determine an interest in a queue of agents (human and/or automated) having a data, logic, authority, and/or other aspect different form that of virtual agent 202. For example, virtual agent 202 may execute step 302 to determine an interest in a particular aspect of contact center 102, such as access to a queue of billing agents, such as to obtain specific billing information, perform an operation, etc. Step 302 may be known with certainty, such as when virtual agent 202 is engaged with a customer and the content of the customer includes a clear indication of a need to have a billing agent perform an operation (e.g., a payment was made but not credited to the customer's account, an explicit request was made by the customer to talk to a billing expert, etc.). Step 302 may alternatively be known with a probability greater that a previously determined threshold. For example, if the previously determined threshold is 65% and the communication content with a customer includes discussions of an account balance, and it is known that discussing account balances requires a billing agent 73% of the time, virtual agent 202 determines an interest in step 302. In contrast, content that includes discussion of billing addresses involve a billing agent 17% of the time; therefore, virtual agent 202 does not assume a billing agent will be needed in step 302, and interaction 300 may terminate or execute iteratively for other topics.

Step 304 registers an interest in the topic (e.g., queue of billing agents). Step 304 may include providing central repository 206 with standardized and/or custom data as a part of step 304. For example, standardized information may include a topic, entity (name, identifier, instance identifier), URL for a Webhook to receive callback messages, and/or other data utilized to register virtual agent 202 to obtain messages from a particular entity or common entities (e.g., entities contributing to a topic). Additionally or alternatively, step 304 may include data specific to a type of information or entity, conditionals (e.g., priority over a certain value), etc. The topic may be broad (e.g., "Billing") or more granular (e.g., "US-English-Billing-Misapplied-Credit"), depending on the particular usage with contact center 102 and the determination made in step 302.

Block 308 comprises at least one step 310 and at least one message 312 received in block 306. Step 310 is performed by entity 204 and may be any activity for which entity 204 is configured and a message (e.g., message 312) is sent. Optionally, entity 204 may comprise a plurality of entities. For example, entity 204 may be a queue for a single billing agent and, when a plurality of billing agents are available, each billing agent is an instance of entity 204 and performs the steps thereof. In other embodiments, entity 204 may represent a number of other entities, such as a queue for a pool of billing agents.

Step 310 may comprise entity 204 performing another task, such as a call with a different customer, and in response, message 312 is generated and sent to central repository 206 (which may comprise receiving a plurality of messages 312). Central repository 206 determines if message 312 satisfies registration criteria of step 304. If message 312 does not satisfy the criteria, central repository 206 does not process the message any further with respect to the particular interest registered in step 304. Other virtual agents or other entities may receive notifications and/or central repository 206 may process message 312 in a manner that affects a different interest registered. For example, message 304 may register an interest as a conditional interest, such as when a queue size exceeds 25. Accordingly, message 312 may decrement or increment the queue size maintained by central repository 206 but not trigger the sending of message 314 until the condition is satisfied. Virtual agent 202 may conduct an operation, alone or with entity 204, and/or other entity in response to message 314, such as exchange 316 between virtual agent 202 and entity 204. As a benefit, any entity having an interest in the queue size of a queue for entity 204 (alone or as a member of a group of entities having a similar purpose) may register and obtain the queue size from central repository 206. Additionally or alternatively, central repository 206 may support direct inquiries from unregistered entities.

Once a condition is satisfied, virtual agent 202 may no longer have an interest in future updates and deregisters in step 318. Deregistration may occur as an explicit message sent from virtual agent 202 to central repository 206, automatically upon receipt or transmission of message 314, or conditionally (e.g., a timeout) by central repository 206 and/or virtual agent 202.

Figure 4:
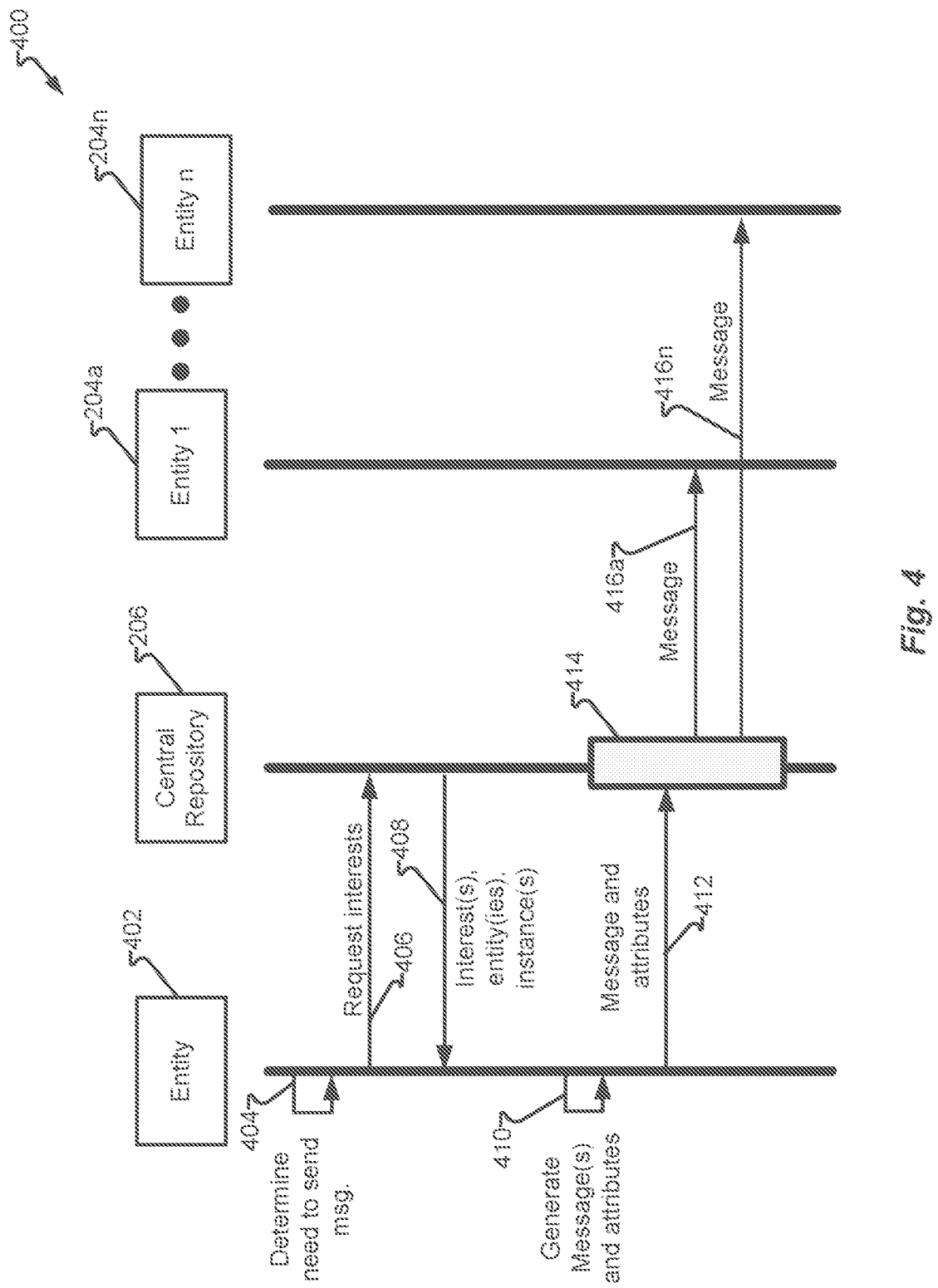
FIG. 4 depicts an interaction in accordance with embodiments of the present disclosure.

FIG. 4 depicts interaction 400 in accordance with embodiments of the present disclosure. In one embodiment, entity 402, is an instance of a virtual agent (e.g., virtual agent 202), and needs to send a message to a number of other entities (i.e., entity 204a-204n) that have previously registered an interest in entity 402 with central repository 206. In step 404, entity 402 determines that a message needs to be sent to one or more other entities. Step 404 may be a status report for another operation, such as a notification that an operation has begun or has been completed, an operation is/is not going according to a workflow, etc. Additionally or alternatively, step 404 may explicitly determine a report should be made, such as a checkpoint message reporting its state or information at a current time or at a current stage in a workflow.

Entity 402 generates and sends message 406 to request interests (e.g., entities to which entity 402 will report). Central repository 206 responds to message 406 with message 408 which may include invoking a REST API of central repository 206 to determine which interests any entity (e.g., entity 204a-204n and/or another entity) are registered, the name/identifier of the registered entities, or which instances to target with the message. In step 410, entity 402 generates the message and the target of the message, which may be determined to be all or a portion of the registered entities.

Message 412 is sent to central repository 206 and may include a structured object or other information, and attributes identify the target(s) of the content portion of message 412. Block 414 receives message 412 and the attributes to identify the targets. Central repository 206, using its REST API, invokes a Webhook URL for each targeted receiver and includes the interests, sender information, structured objects, and/or other information in message 408 in the Webhook call. The structured object may convey state information or other content. In step 410, entity 402 performs one or more operations, which may include processes altering the internal state of entity 402, generating the structured object, etc. For example, entity 402 may be about to transfer a customer to an agent and, via information obtained in message 408 and/or other processes, report to the customer the customer's position in the wait queue for the agent and report when that position has been decremented. Subsequently, message 412 is sent to central repository 206 and registered entities (e.g., entity 204a-204n) are provided with messages 416a-416n, respectively.

The targets may be explicitly identified (e.g., by name/identifier) or condition (e.g., entities having a certain number of tasks with a certain priority, interests that have not yet expired, a value of a datum in the structured object, etc.). Block 414 then sends the message to the designated targets, such as entity 1 (entity 204a) through entity n (entity 204n). As a benefit, little if any coding is required in order for entity 402 to determine which entities will and will not receive a message. In another embodiment, entity 402 may specify an initial delay, multiplicity, or periodicity to send each of a series of messages.

Figure 5:
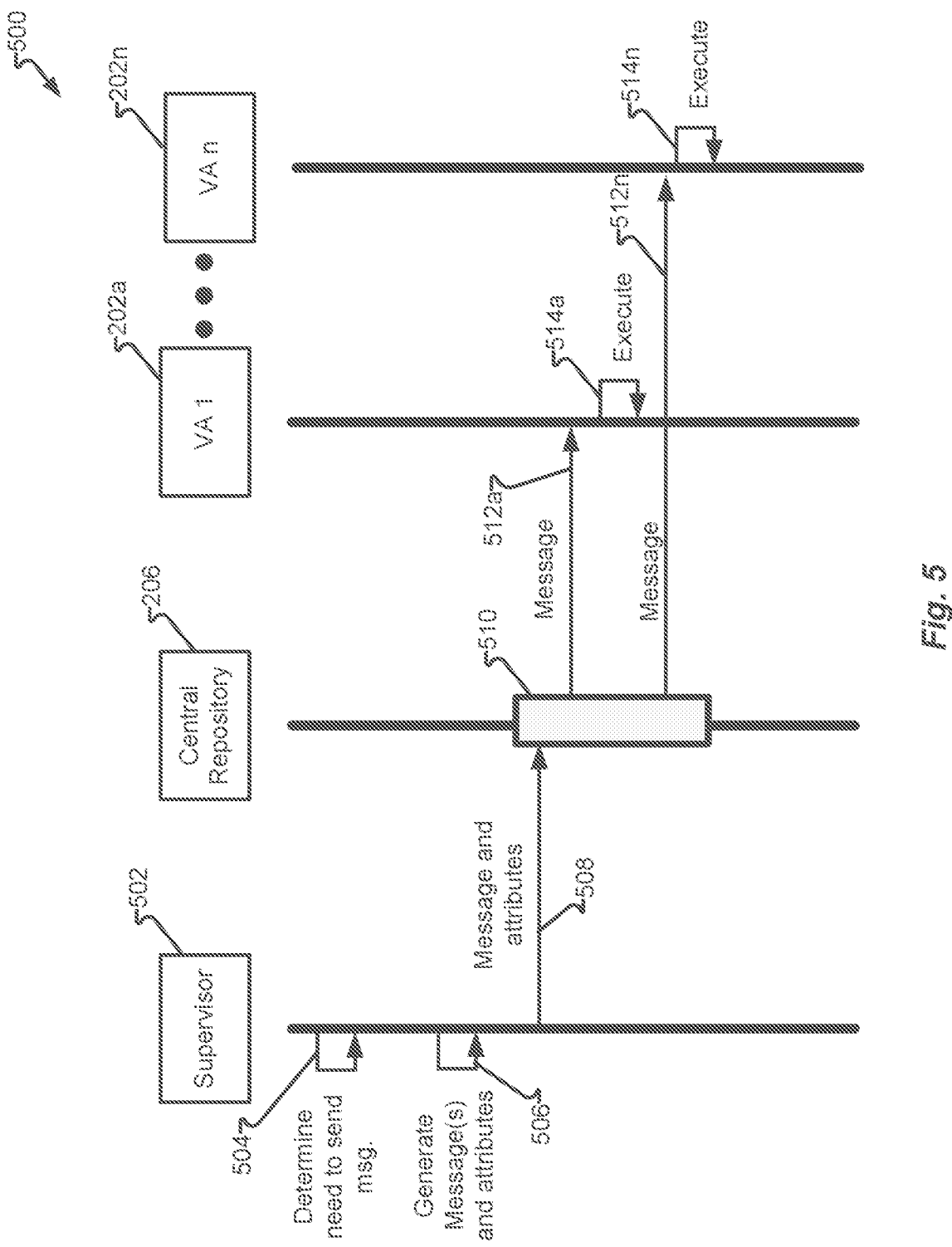
FIG. 5 depicts an interaction in accordance with embodiments of the present disclosure.

FIG. 5 depicts interaction 500 in accordance with embodiments of the present disclosure. In one embodiment, supervisor 502 determines a need to send a message to one or more instances of a virtual agent, such as virtual agent 202a-202n. Supervisor 502 may be embodied as an automated supervisor or a human utilizing a communication device to generate, send, receive, and process messages transmitted over a network (e.g., network 104). For example, supervisor 502 may determine that contact center 102 is experiencing a spike in volume and, as a result, wait times are exceptionally long for customers currently engaged with virtual agents (e.g., virtual agent 202a-202n) to be transferred to a live agent or otherwise receive support for their work item. As a result, supervisor 502 may wish to send a message to each affected virtual agent 202a-202n and have the message delivered to their respective customer, such as to apologize for the delay or offer another incentive. However, there may be one or more virtual agents 202 not affected by the delay and who therefore do not need to receive and present the message to their customers.

In one embodiment, interaction 500 begins and, in step 504, a need to send a message is determined. Step 506 then generates the message to be delivered to target recipients, such as virtual agents 202a-202n. The message generated in step 506 may include one or more message attributes. For example, the generated message may comprise an attribute comprising a structured object having one or more data fields known to be understood by the recipient, such as a message having conditions (e.g., "Applicable with an urgency score over Urgentcy_Threshold," "If the current customer priority is not greater than Priority_Threshold, then ignore," "Only applies to 'gold' level customers," "Deliver to the customer with step X of Customer_Workflow," "Repeat 3 times, every fifteen minutes unless canceled," etc.). Message 508 is then provided to central repository 206 at block 510.

Central repository 206, at block 510, determines recipients, such as all virtual agents 202 having previously registered an interest in supervisor 502 and/or those conditionally selected from attributes contained in message 508. In response, messages 512a-512n are sent to virtual agents 202a-202n for execution in steps 514a-514n, respectively.

Figure 6:
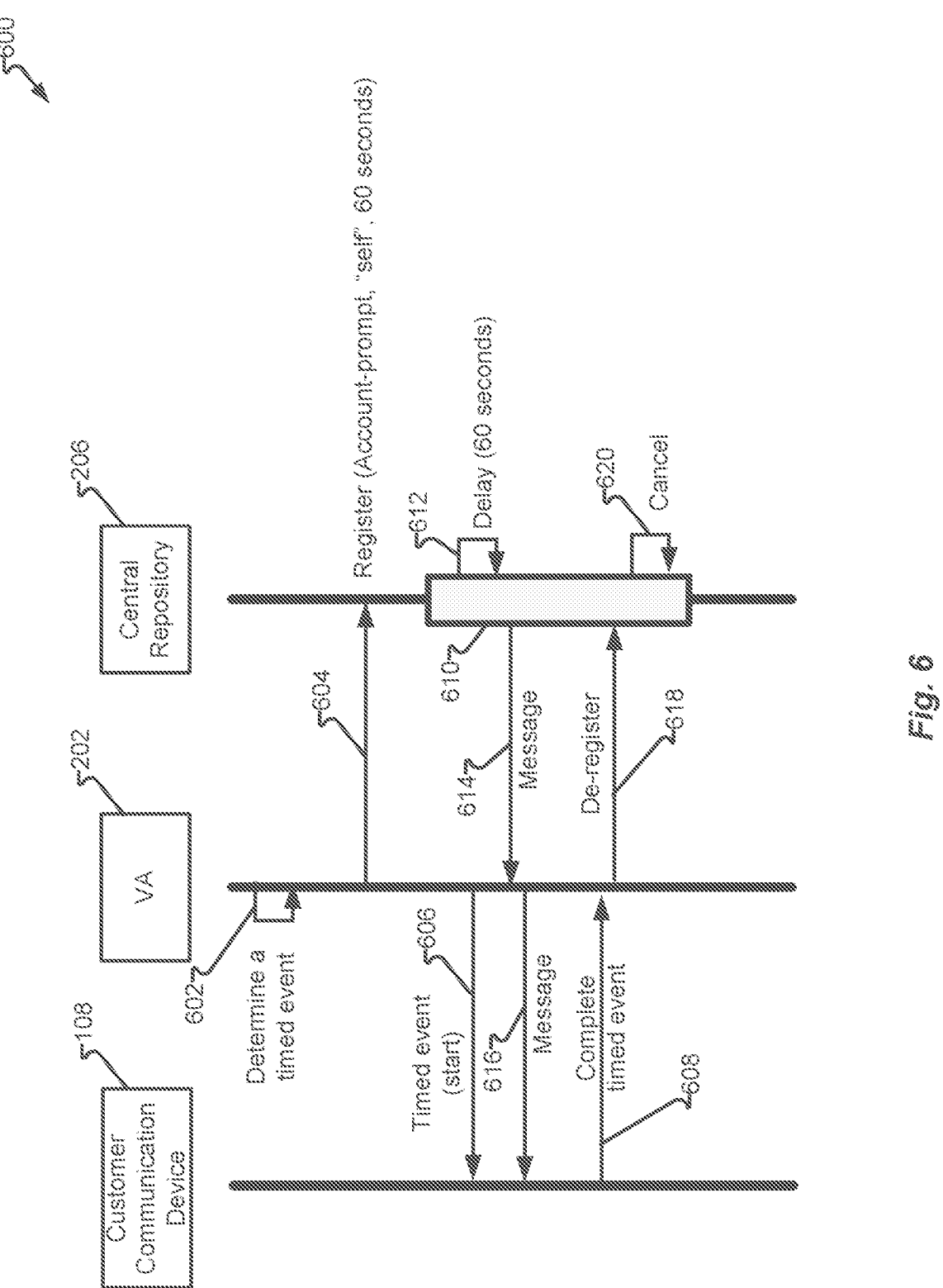
FIG. 6 depicts an interaction in accordance with embodiments of the present disclosure.

FIG. 6 depicts interaction 600 in accordance with embodiments of the present disclosure. In another embodiment, virtual agent 202 is both a registered interest and a message sender, such as to conditionally send a message to itself. For example, a customer utilizing customer communication device 108 may be asked by virtual agent 202 to perform an operation and, if the operation is not performed, trigger a message or other event (e.g., transfer the customer to another agent, initiate a different workflow, etc.).

In step 602, virtual agent 202 determines a timed event is to occur. Additionally or alternatively, step 602 may determine a different condition. In response, virtual agent 202 sends message 604 to central repository 206 to register an interest for a particular topic (e.g., "account-prompt," the condition(s) (e.g., delay 60 seconds), and a Webhook URL identifying the target (virtual agent 202 itself).

Substantially concurrently with registration message 604, the event is started, such as by virtual agent 202 providing message 606 to customer communication device 108, and block 610 is executed. In one portion of interaction 600, message 608 (indicating performance of the operation) is sent by customer communication device 108 to virtual agent 202 and, in response, virtual agent 202 sends message 618 to deregister, which causes central repository 206 to cancel any unsent messages in step 620 and terminate block 610. In a second portion of block 610, the condition is executed by central repository 206, such as delay 612 and, once complete, sends message 614 to virtual agent 202.

Block 610 performs the condition at step 612 (e.g., delay for 60 seconds) and waits for deregistration message 618. If deregistration message 618 is not received, virtual agent 202 sends message 616 to customer communication device 108, the contents of which were determined by message 604. Block 610 may continually execute, such as to cause multiple messages 614 to be sent to virtual agent 202, and in response, multiple messages 616 to be sent to customer communication device 108. As can be appreciated, the messages may be selectively altered and/or timeout or trigger different messages or different workflows, such as to save interaction data and terminate an interaction with customer communication device 108 if no response is received after an extended period of time.

Figure 7:
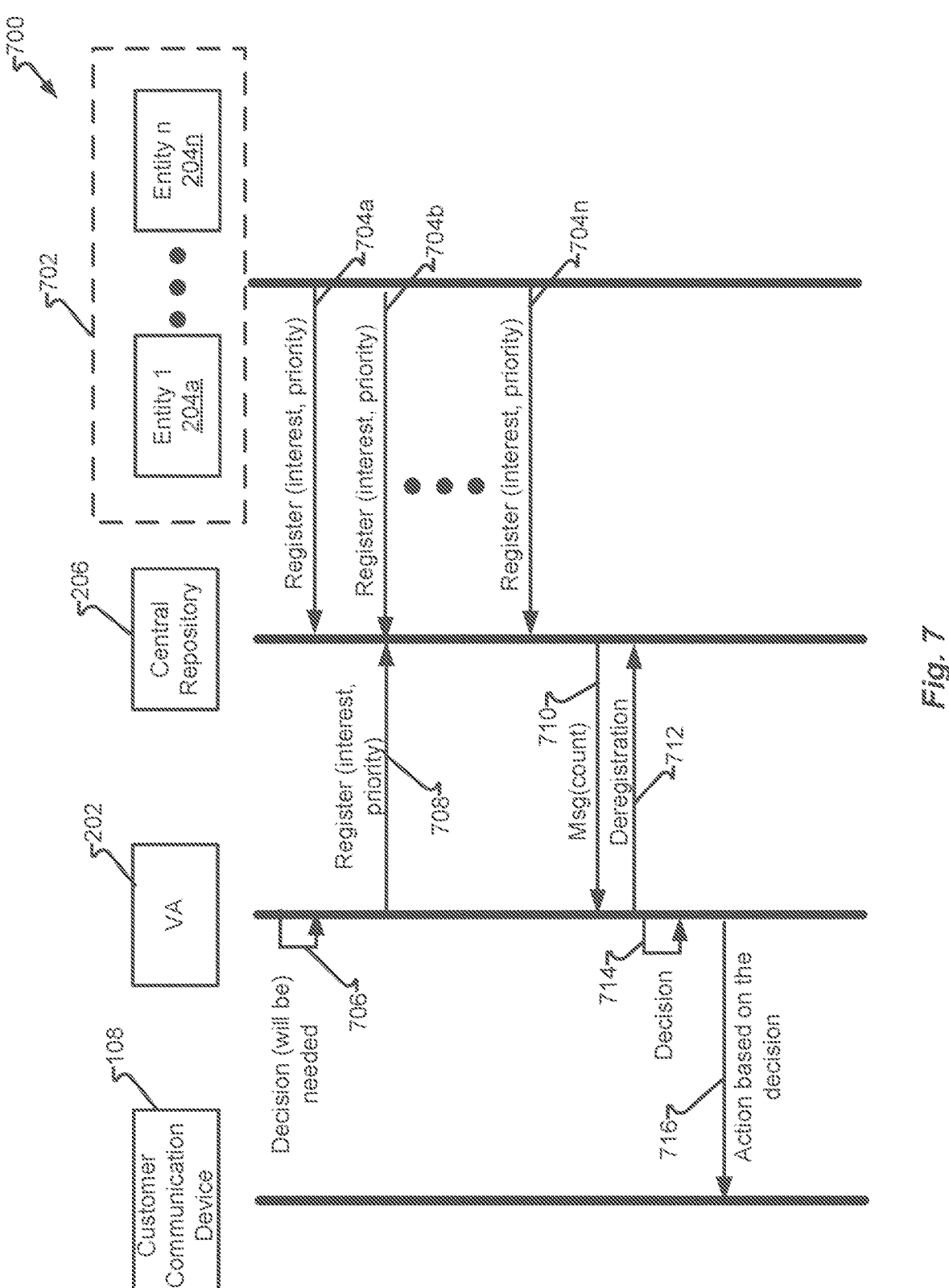
FIG. 7 depicts an interaction in accordance with embodiments of the present disclosure.

FIG. 7 depicts interaction 700 in accordance with embodiments of the present disclosure. In another embodiment, registration may occur on an ad hoc basis, such as in response to determining a need for an absent datum. Set of entities 702, such as entity 204a-204n, register an interest with central repository 206 via registration messages 704a-704n. Any one or more registration messages 704a-704n may occur concurrently, separately, such as upon startup, intermittently, sporadically, or over another time period, which may include occurring at any point before or after execution of step 706, wherein a decision for information is determined by virtual agent 202. For example, each registration message 704a-704n may indicate a particular step in a workflow or attribute of an interaction with a customer, such as a priority.

Upon completion of step 706, virtual agent 202 generates and sends registration message 708 to register an interest with central repository 206. The interest portion of registration message 708 may be identical, similar to, or merely related to, the interest of registration messages 704a-704n. For example, registration messages 704a-704n may each report their priority, such as to receive any messages associated with a particular priority of their current interaction with a customer. Registration message 708 may have a narrower interest and register an interest further limited to only those priorities that are over a certain previously determined threshold.

In response to message 708, central repository 206 sends message 710 to virtual agent 202, such as to provide a count of the number of entities 204a-204n that are currently processing communications with customers having the specified priority. Optionally, virtual agent 202 sends deregistration message 712 to discontinue any further instances of message 710 being sent. With the information received, virtual agent 202 performs step 714 to determine if the value requires action 716, such as the sending of a particular message to customer communication device 108 (e.g., offering a callback from an agent when the wait time due to enqueued high-priority calls is excessive), or another action.

Figure 8:
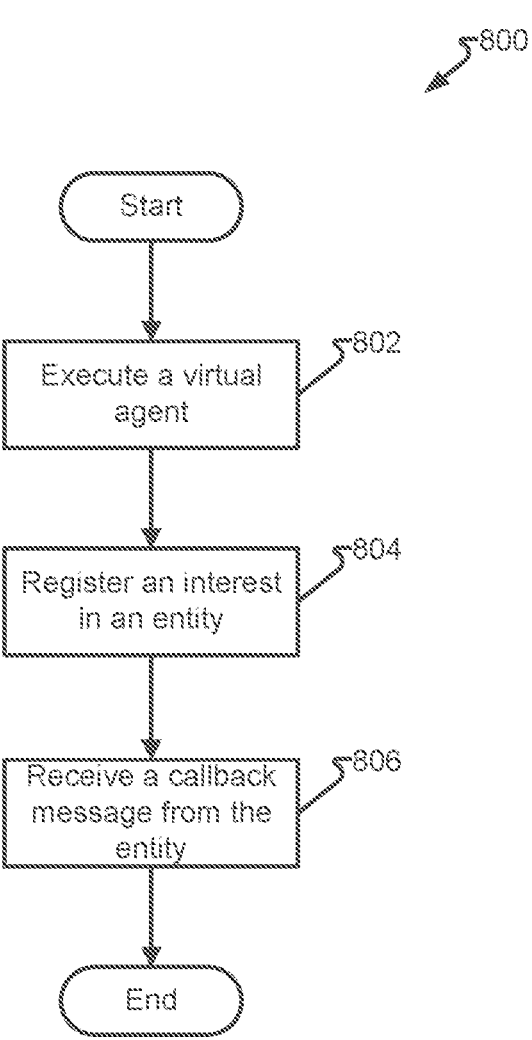
FIG. 8 depicts a process in accordance with embodiments of the present disclosure.

FIG. 8 depicts process 800 in accordance with embodiments of the present disclosure. In one embodiment, process 800 is embodied as machine-readable instructions maintained in a non-transitory memory that when read by a machine, such as processors of a server, cause the machine to execute the instructions and thereby execute process 800. The processor of the server may include, but is not limited to, at least one processor of a server, such as one or more servers 208 of central repository 206 or other electronic computing component.

In one embodiment, process 800 begins and, at step 802, executes a virtual agent, such as virtual agent 202. The virtual agent engages in a communication with a customer via network 104 and customer communication device 108 utilized by the customer. The communication may comprise natural language provided by the customer and generated by the virtual agent to resolve a work item as determined from the content therein (e.g., the words spoken, questions asked, instructions given, etc.). However, in other embodiments, the work item may be determined by other processes or steps, such as by selecting a particular option presented in an IVR session. In such embodiments, the communication may be provided to gather relevant information, carry out a resolution to the work item, and/or another operation necessary to resolve the work item.

The virtual agent may require information or action by another entity and/or another entity may require an action or information from the virtual agent. In response to determining a need to/from another entity, at step 804, the virtual agent registers an interest in the entity, an entity interaction, a category of entities, an attribute of one or more entities, etc. with a central repository, such as central repository 206. As a benefit, the coding required to be deployed by the virtual agent may be limited to basic messaging functions, which may already exist.

In step 806, a call back message is received from the entity. The message, or data associated therewith, may be determined by one or more other messages sent from the entity to the central repository.

Figure 9:
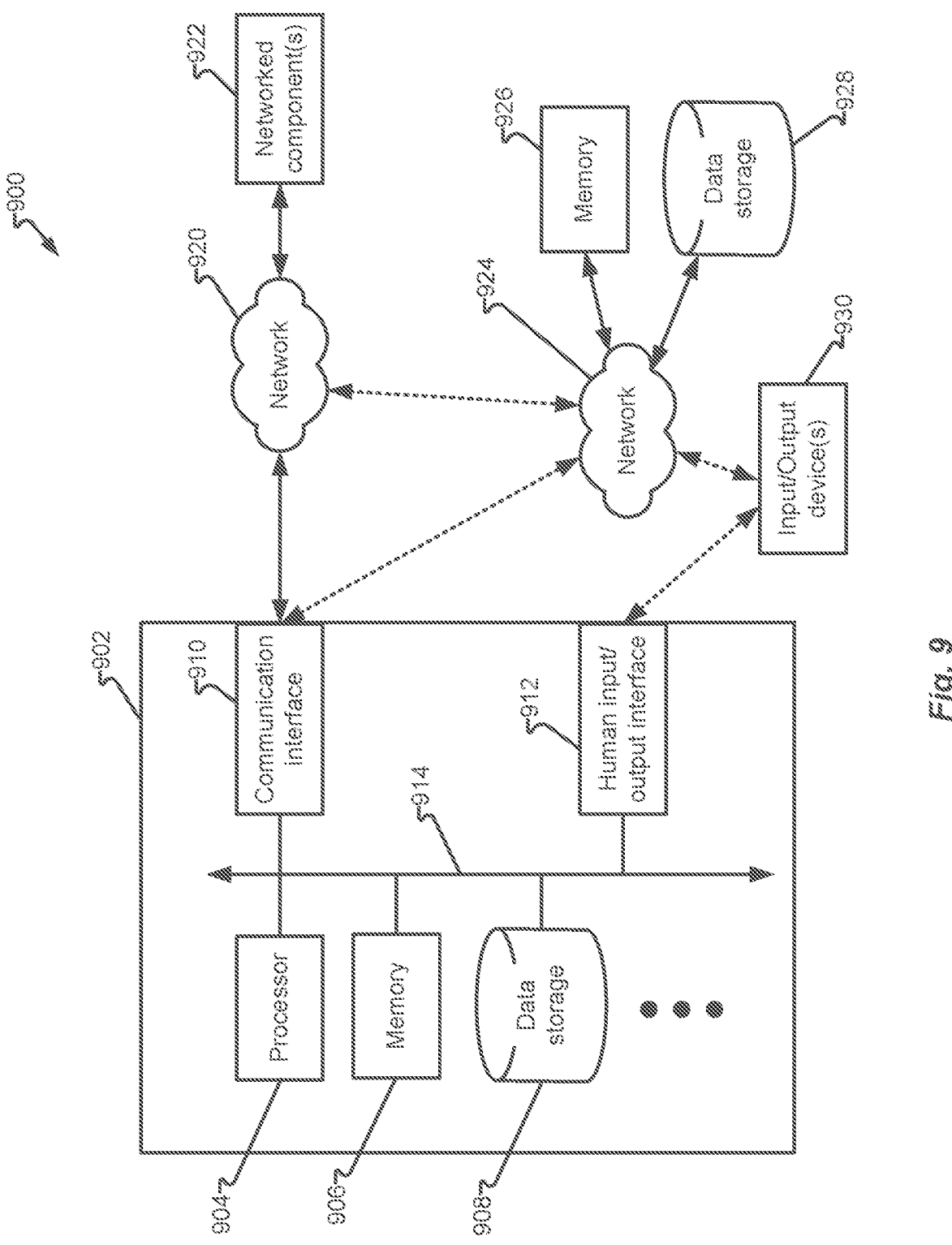
FIG. 9 depicts a device in a system in accordance with embodiments of the present disclosure.

FIG. 9 depicts device 902 in system 900 in accordance with embodiments of the present disclosure. In one embodiment, server 208 and/or an electronic computing device executing virtual agent 202 and/or an electronic computing device executing entity 204 may be embodied, in whole or in part, as device 902 comprising various components and connections to other components and/or systems. The components are variously embodied and may comprise processor 904. The term "processor," as used herein, refers exclusively to electronic hardware components comprising electrical circuitry with connections (e.g., pin-outs) to convey encoded electrical signals to and from the electrical circuitry. Processor 904 may comprise programmable logic functionality, such as determined, at least in part, from accessing machine-readable instructions maintained in a non-transitory data storage, which may be embodied as circuitry, on-chip read-only memory, computer memory 906, data storage 908, etc., that cause the processor 904 to perform the steps of the instructions. Processor 904 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 914, executes instructions, and outputs data, again such as via bus 914. In other embodiments, processor 904 may comprise a shared processing device that may be utilized by other processes and/or process owners, such as in a processing array within a system (e.g., blade, multi-processor board, etc.) or distributed processing system (e.g., "cloud," farm, etc.). It should be appreciated that processor 904 is a non-transitory computing device (e.g., electronic machine comprising circuitry and connections to communicate with other components and devices). Processor 904 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 904). Processor 904 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 904, device 902 may utilize computer memory 906 and/or data storage 908 for the storage of accessible data, such as instructions, values, etc. Communication interface 910 facilitates communication with components, such as processor 904 via bus 914 with components not accessible via bus 914. Communication interface 910 may be embodied as a network port, card, cable, or other configured hardware device. Additionally or alternatively, human input/output interface 912 connects to one or more interface components to receive and/or present information (e.g., instructions, data, values, etc.) to and/or from a human and/or electronic device. Examples of input/output devices 930 that may be connected to input/output interface include, but are not limited to, keyboard, mouse, trackball, printers, displays, sensor, switch, relay, speaker, microphone, still and/or video camera, etc. In another embodiment, communication interface 910 may comprise, or be comprised by, human input/output interface 912. Communication interface 910 may be configured to communicate directly with a networked component or configured to utilize one or more networks, such as network 920 and/or network 924.

Network 104 may be embodied, in whole or in part, as network 920. Network 920 may be a wired network (e.g., Ethernet), wireless (e.g., WiFi, Bluetooth, cellular, etc.) network, or combination thereof and enable device 902 to communicate with networked component(s) 922. In other embodiments, network 920 may be embodied, in whole or in part, as a telephony network (e.g., public switched telephone network (PSTN), private branch exchange (PBX), cellular telephony network, etc.).

Additionally or alternatively, one or more other networks may be utilized. For example, network 924 may represent a second network, which may facilitate communication with components utilized by device 902. For example, network 924 may be an internal network to a business entity or other organization, such as contact center 102, whereby components are trusted (or at least more so) than networked components 922, which may be connected to network 920 comprising a public network (e.g., Internet) that may not be as trusted.

Components attached to network 924 may include computer memory 926, data storage 928, input/output device(s) 930, and/or other components that may be accessible to processor 904. For example, computer memory 926 and/or data storage 928 may supplement or supplant computer memory 906 and/or data storage 908 entirely or for a particular task or purpose. As another example, computer memory 926 and/or data storage 928 may be an external data repository (e.g., server farm, array, "cloud," etc.) and enable device 902, and/or other devices, to access data thereon. Similarly, input/output device(s) 930 may be accessed by processor 904 via human input/output interface 912 and/or via communication interface 910 either directly, via network 924, via network 920 alone (not shown), or via networks 924 and 920. Each of computer memory 906, data storage 908, computer memory 926, data storage 928 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 930 may be a router, a switch, a port, or other communication component such that a particular output of processor 904 enables (or disables) input/output device 930, which may be associated with network 920 and/or network 924, to allow (or disallow) communications between two or more nodes on network 920 and/or network 924. For example, a connection between one particular customer, using a particular customer communication device 108, may be enabled (or disabled) with a particular networked component 922 and/or particular resource 112, in particular embodiments of an automated resource such as virtual agent 202. Similarly, one particular networked component 922 and/or resource 112 may be enabled (or disabled) from communicating with a particular other networked component 922 and/or resource 112, including, in certain embodiments, device 902 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud," multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® 15-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for virtual agent collaboration, comprising:
a processor;
a network interface to a network; and
a memory comprising a set of instructions that, when executed by the processor, cause the processor to:
    execute a virtual agent to conduct a communication, with content encoded therein, with a customer via the network, and process a work item determined from the content, wherein completing the work item requires an action by an entity different from the virtual agent;
    generate a message to register an interest in the entity, the message comprising an identifier of the virtual agent, an address on the network wherein the virtual agent receives callback messages, and a topic of interest corresponding to the action;
    send the message to a central repository;
    receive a callback message from the central repository comprising a datum required to complete the action; and
    complete the work item comprising the action.

2. The system of claim 1, wherein the action comprises at least one of an act performed by the entity or indicia of the act being performed by the entity.

3. The system of claim 1, wherein the virtual agent sends the message to the entity further comprising the virtual agent sending the message to the central repository via a call to a Representative State Transfer Application Programming Interface (REST API).

4. The system of claim 3, wherein the address on the network comprises a uniform resource locator (URL) of a Webhook for the virtual agent in the call to the REST API.

5. The system of claim 3, wherein:
the network comprises a first discrete network and a second discrete network;
the processor resides entirely with the first discrete network;
the second discrete network maintains the datum required to complete the action and wherein the datum is absent from the first discrete network; and
the first discrete network and the second discrete network are interconnected via messages sent to the central repository.

6. The system of claim 1, wherein the action comprises determining the work item.

7. The system of claim 1, wherein the action comprises identifying a collection of actions that, when performed, complete the work item.

8. The system of claim 1, wherein the callback message comprises a plurality of callback messages having at least one of different time sent by the entity or a change in a state of the entity.

9. The system of claim 8, wherein at least one of the entity or the virtual agent de-registers the interest and terminates the step of receiving the callback message, comprising at least one of the plurality of callback messages.

10. The system of claim 1, wherein the message further comprises at least one of an identifier of the virtual agent, an identifier of an instance of the virtual agent, a priority, and an expiration.

11. The system of claim 1, wherein the message further comprises a structured data object comprising at least one data element maintaining indicia of at least one of the content, the communication, the work item, or a portion of the work item performed by the virtual agent.

12. The system of claim 1, wherein the central repository determines from the message the entity that best matches the message from a pool of entities.

13. A method for virtual agent collaboration, comprising:
    executing a virtual agent to conduct a communication, with content encoded therein, with a customer via a network, and processing a work item determined from the content, wherein completing the work item requires an action by an entity different from the virtual agent;
    generating a message to register an interest in the entity, the message comprising an identifier of the virtual agent, an address on the network wherein the virtual agent receives callback messages, and a topic of interest corresponding to the action;
    sending the message to a central repository;
    receiving a callback message from the central repository comprising a datum required to complete the action; and
    completing the work item comprising the action.

14. The method of claim 13, further comprising sending a message to the central repository via a call to a Representative State Transfer Application Programming Interface (REST API).

15. The method of claim 14, wherein the address on the network comprises a uniform resource locator (URL) of a Webhook for the virtual agent in the call to the REST API.

16. The method of claim 13, wherein:
the network comprises a first discrete network and a second discrete network;
the virtual agent resides entirely with the first discrete network;
the second discrete network maintains the datum required to complete the action, wherein the datum is absent from the first discrete network; and
the first discrete network and the second discrete network are interconnected via messages sent to the central repository.

17. The method of claim 13, wherein the action comprises identifying a collection of actions that, when performed, complete the work item.

18. The method of claim 13, wherein the callback message comprises a plurality of callback messages having different times sent by the entity or a change in a state of the entity.

19. The method of claim 18, wherein at least one of the entity or the virtual agent de-registers the interest and terminates the step of receiving the callback message, comprising at least one of the plurality of callback messages.

20. A system for virtual agent collaboration, comprising:
a processor;
a network interface to a network; and
a memory comprising a set of instructions that, when executed by the processor, cause the processor to:
    execute a first virtual agent to conduct a communication, with content encoded therein, with a customer via the network, and process a work item determined from the content, wherein completing the work item requires an action by a second virtual agent differing from the first virtual agent in at least one of an input to at least one training stage, access to a datum required to complete the work item, or access to a component requiring an interaction therewith to complete the work item;

register an interest of the first virtual agent in the second virtual agent, comprising generating a message comprising an identifier of the first virtual agent, an address on the network wherein the first virtual agent receives callback messages, and a topic of interest corresponding to the action;

send the message to the second virtual agent via a repository, wherein the message comprises a call Representative State Transfer Application Programming Interface (REST API) to access the repository;

receive a callback message, via the REST API, comprising receiving a callback message from a central repository, the callback message comprising the datum required to resolve the action; and complete the work item comprising the action.

\* \* \* \* \*